(12) United States Patent
Nakatani et al.

(10) Patent No.: US 6,483,784 B1
(45) Date of Patent: Nov. 19, 2002

(54) MAGNETO-OPTICAL RECORDING MEDIUM HAVING A HEAT-SINK LAYER

(75) Inventors: Morio Nakatani, Gifu (JP); Kenji Tanase, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 153 days.

(21) Appl. No.: 09/670,612

(22) Filed: Sep. 27, 2000

(30) Foreign Application Priority Data

Sep. 30, 1999 (JP) ............................................ 11-278777
Sep. 14, 2000 (JP) ....................................... 2000-279374

(51) Int. Cl.[7] ............................................. G11B 11/00
(52) U.S. Cl. .................................. 369/13.38; 428/64.3
(58) Field of Search ........................... 369/13.38, 13.39, 369/13.35, 13.36, 13.4, 13.53; 428/64.3, 694 ML

(56) References Cited

U.S. PATENT DOCUMENTS

| | | | | |
|---|---|---|---|---|
| 5,233,575 A | * | 8/1993 | Uchino et al. | 369/13.38 |
| 5,381,396 A | * | 1/1995 | Tanaka et al. | 369/13 |
| 5,521,006 A | * | 5/1996 | Osato | 369/13.38 |
| 5,656,370 A | * | 8/1997 | Murakami et al. | 369/13.38 |
| 6,265,062 B1 | * | 7/2001 | Shiratori | 369/13 |
| 6,017,620 A1 | * | 1/2002 | Yoshinari et al. | 369/13.38 |
| 6,349,076 B1 | * | 2/2002 | Chen | 369/13.38 |

FOREIGN PATENT DOCUMENTS

JP 2000-149348 5/2000

* cited by examiner

*Primary Examiner*—Tan Dinh
(74) *Attorney, Agent, or Firm*—Armstrong, Westerman & Hattori, LLP

(57) ABSTRACT

A magneto-optical recording medium includes a transparent substrate, an underlying layer, a reproducing layer, a heat sink layer, a recording layer, a protection layer and a UV ray cured resin. The transparent substrate is formed of a transparent material, such as glass, polycarbonate, or the like. The underlying layer is formed of SiN. The reproducing layer is formed of GdFeCo and it is an in-plane magnetic film when it has room temperature and it alters to a vertically magnetic film when it has a temperature exceeding 150° C. The heat sink layer is formed of Al with a thickness blocking the exchanging-coupling from the recording layer to the reproducing layer. The recording layer is formed of TbFeCo and it is a vertically magnetic film when it has room temperature. The protection layer is formed of SiN. At such, in reproducing a signal the heat of the reproducing layer can enjoy an increased heat sink effect and thus have formed therein a detection window reduced in size.

20 Claims, 14 Drawing Sheets

FIG. 2

| TARGET | Al |
|---|---|
| FLOW RATE OF Ar GAS(sccm) | 40 ~ 80 |
| PRESSURE(Pa) | 0.4 ~ 1.33 |
| DC POWER(W/cm$^2$) | 0.5 ~ 2.5 |
| SUBSTRATE TEMPERATURE(°C) | 20 ~ 80 |

MAGNETO-OPTICAL RECORDING MEDIUM HAVING A HEAT-SINK LAYER

BACKGROUND OF THE INVENTION

1. Field of the Invention

The present invention relates generally to magneto-optical recording media and particularly to those providing a heat sink effect.

2. Description of the Background Art

Magneto-optical recording media have been noted as a recording medium which is rewritable, has a large recording capacity and is highly reliable, and they are put to use for example as computer memory. Furthermore recently a magneto-optical recording medium provided in the form of a 120 mm$\phi$ disc having a storage capacity of 6 Gbytes is about to be put to use as an Advanced Storage Magneto-Optical (AS-MO) disk standard. To reproduce a signal from such a high-density magneto-optical recording medium a laser beam is directed thereto to form at a reproducing layer thereof a detection window smaller than the laser beam's spot diameter and a magnetic domain of the recording layer is transferred to the detection window and the transferred magnetic domain is thus detected. This technique is referred to as magnetically induced super resolution (MSR).

Furthermore, there has also been developed a technique applying an alternate magnetic field to a magneto-optical recording medium and transferring a magnetic domain from a recording layer to a reproducing layer and enlarging the transferred magnetic domain to reproduce a signal. Using this magnetic-domain enlargement and reproduction technique, there has also been suggested a magneto-optical recording medium having a recording capacity of 14 Gbytes.

A magneto-optical recording medium is irradiated with a laser beam to record or reproduce a signal. As such, to diffuse heat generated through the laser beam radiation, to prevent the laser beam's focus from blurring, and to prevent a magnetic layer of the recording medium from being oxidized, the recording medium has sputtered on a substrate a magnetic layer including a recording layer and a reproducing layer, and a protection layer, e.g., of SiN and/or a heat diffusing layer for example of Al then added thereon.

More specifically, with reference to FIG. 14, a conventional magneto-optical recording medium 70 has a transparent substrate 71 and has formed thereon an underlying layer 72 formed of SiN, a reproducing layer 73 formed of GdFeCo, a non-magnetic layer 74 formed of SiN, a recording layer 75 formed of TbFeCo, a protection layer 76 formed of SiN and a heat diffusing layer 77 formed of Al, successively stacked in layers, as seen in cross section. In general, after heat diffusing layer 77 is formed UV ray cured resin or the like is used to coat the recording medium to prevent the recording medium from being oxidized and damaged.

Heat diffusing layer 77, provided after reproducing layer 73 and recording layer 75 are sputtered, also prevents reproducing layer 73 and recording layer 75 from being oxidized. As such, heat diffusing layer 77 is provided opposite to transparent substrate 71.

However, as its recording density increases, recording layer 75 has formed therein a magnetic domain reduced in size. As such, when in reproducing a signal a laser beam is directed to the recording medium and a detection window is formed in reproducing layer 73, a plurality of magnetic domains are transferred from recording layer 75 to the detection window formed in reproducing layer 73. Thus, accurate signal reproduction cannot be achieved.

More specifically, conventional magneto-optical recording medium 70 has reproducing layer 73 posed between SiN forming underlying layer 72 and SiN forming non-magnetic layer 74. As such, the heat generated in reproducing layer 73 through laser beam radiation is not so much emitted therefrom. This increases a region heated to a temperature allowing a magnetic domain of recording layer 75 to be transferred. Consequently, a plurality of magnetic domains are transferred from recording layer 75 to reproducing layer 73 and accurate signal reproduction can thus not be achieved.

SUMMARY OF THE INVENTION

The present invention therefore contemplates a magneto-optical recording medium capable of forming in a reproducing layer a detection window having a size approximately corresponding to a shortest length of a magnetic domain formed in a recording layer.

The present invention provides a magneto-optical recording medium including a recording layer having formed therein a magnetic domain magnetized according to a signal to be recorded, a reproducing layer receiving the magnetic domain transferred from the recording layer, and a heat sink layer formed in contact with the reproducing layer and the recording layer and blocking exchanging-coupling between the reproducing layer and the recording layer.

When the present magneto-optical recording medium is irradiated with a laser beam, the reproducing layer generates heat, which diffuses from the reproducing layer to the heat sink layer and the reproducing layer has in an in-plane direction thereof a steep temperature profile. The reproducing layer has formed therein a detection window each receiving an individual magnetic domain transferred from the recording layer. Furthermore, the heat sink layer is provided also in contact with the recording layer. As such, the heat generated in the recording layer through laser beam radiation also diffuses from the recording layer to the heat sink. layer to allow the recording layer to have a steep temperature profile. Thus in the present invention if the recording layer has a magnetic domain reduced in length each magnetic domain of the recording layer can be detected with high resolution. Furthermore in the present invention the recording layer can have formed therein a magnetic domain reduced in length to record a signal densely.

Furthermore the present invention provides a magneto-optical recording medium including a recording layer having formed therein a magnetic domain magnetized according to a signal to be recorded, a first reproducing layer receiving the magnetic domain transferred from the recording layer, a second reproducing layer receiving the magnetic domain transferred to the first reproducing layer and further transferred from the first reproducing layer through magnetostatic-coupling, and a heat sink layer formed in contact with the first reproducing layer and the recording layer and blocking exchanging-coupling between the first reproducing layer and the recording layer, wherein the second reproducing layer is formed of a magnetic material allowing the transferred magnetic domain to be enlarged by an external magnetic field.

When the present magneto-optical recording medium is irradiated with a laser beam, the first reproducing layer generates heat, which diffuses from the first reproducing layer to the heat sink layer to allow the first reproducing layer to have in an in-plane direction thereof a steep temperature profile. The recording layer has formed therein a detection window each receiving an individual magnetic domain transferred from the recording layer through magnetostatic-coupling. The magnetic domain transferred to the first reproducing layer is further transferred to the second reproducing layer through magnetostatic-coupling. The magnetic domain transferred to the second reproducing layer is enlarged by an external magnetic field and detected by a laser beam directed thereto. Furthermore, the heat sink layer is provided also in contact with the recording layer. As such, the heat generated in the recording layer through laser beam radiation also diffuses from the recording layer to the heat sink layer to allow the recording layer to have a steep temperature profile. Thus in the present invention if the recording layer has a magnetic domain reduced in length each magnetic domain of the recording layer can be detected in the first reproducing layer with high resolution and also enlarged and thus reproduced in the second reproducing layer. Furthermore in the present invention the recording layer can have formed therein a magnetic domain reduced in length to allow a signal to be recorded densely.

Furthermore the present invention provides a magneto-optical recording medium including a recording layer having formed therein a magnetic domain magnetized according to a signal to be recorded, a first heat sink layer formed in contact with the recording layer, a reproducing layer receiving a magnetic domain transferred from the recording layer through magnetostatic-coupling, and a second heat sink layer formed in contact with the reproducing layer.

When the present magneto-optical recording medium is irradiated with a laser beam, the recording layer stores heat, which is absorbed by the first heat sink layer, and the reproducing layer stores heat, which is absorbed by the second heat sink layer. Thus the reproducing layer and the recording layer each have in an in-plane direction thereof a steep heat distribution. Thus in the present invention a short magnetic domain can be used to record a signal in the recording layer densely. Furthermore, the short magnetic domain formed in the recording layer can be detected in the reproducing layer with high resolution.

Furthermore, the present invention provides a magneto-optical recording medium including a recording layer having formed therein a magnetic domain magnetized according to a signal to be recorded, a first heat sink layer formed in contact with the recording layer, a first reproducing layer receiving a magnetic domain transferred from the recording layer through magnetostatic-coupling, a second heat sink layer formed in contact with the first reproducing layer, and a second reproducing layer receiving the magnetic domain transferred to the first reproducing layer and further transferred from the first reproducing layer through magnetostatic-coupling, wherein the second reproducing layer is formed of a magnetic material allowing the transferred magnetic domain to be enlarged by an external magnetic field.

When the present magneto-optical recording medium is irradiated with a laser beam, the recording layer stores heat, which is absorbed by the first heat sink layer, and the first reproducing layer stores heat, which is absorbed by the second heat sink layer. Thus, the first reproducing layer and the recording layer each have in an in-plane direction thereof a steep temperature profile. Thus, a magnetic domain is transferred from the recording layer to the first reproducing layer through magnetostatic-coupling with high resolution and the magnetic domain is further transferred from the first reproducing layer to the second reproducing layer through magnetostatic-coupling. The magnetic domain transferred to the second reproducing layer is enlarged by an external magnetic field and detected by a laser beam. Thus in the present invention a short magnetic domain can be formed in the recording layer to allow a signal to be recorded densely. Furthermore, the short magnetic domain formed in the recording layer can be transferred to the first reproducing layer with high resolution and the magnetic domain thus transferred can be enlarged and thus reproduced in the second reproducing layer.

Furthermore the present invention provides a magneto-optical recording medium including a recording layer having formed therein a magnetic domain magnetized according to a signal to be recorded, a non-magnetic layer formed in contact with the recording layer, a reproducing layer formed in contact with the non-magnetic layer and receiving the magnetic domain transferred from the recording layer, and a heat sink layer formed in contact with the reproducing layer.

When the present magneto-optical recording medium is irradiated with a laser beam, the reproducing layer stores heat, which is absorbed by the heat sink layer formed of a magnetic material. Thus the reproducing layer has in an in-plane direction thereof a steep temperature profile. Thus a magnetic domain is transferred from the recording layer via the non-magnetic layer to the reproducing layer through magnetostatic-coupling with high resolution. As such in the present invention the heat sink layer provided on a side receiving a laser beam can absorb the heat stored in the reproducing layer, to transfer a magnetic domain to be transferred to the reproducing layer with high resolution.

Preferably, the magneto-optical recording medium including the heat sink layer provided in contact with the reproducing layer and the recording layer satisfies $(Pc \times Tex)/(p \times t) \leq 1$, wherein Tex represents a minimal film thickness required to block exchanging-coupling, Pc represents a heat conductivity of a material of the reproducing layer higher than a heat conductivity of any other material of the reproducing layer at room temperature, p represents a heat conductivity of a material of the heat sink layer at room temperature and t represents a thickness of the heat sink layer, t being larger than Tex.

In the present magneto-optical recording medium, the heat sink layer diffuses more heat than the reproducing layer. More specifically, when the magneto-optical recording medium is irradiated with a laser beam, the reproducing layer stores heat, which is absorbed by the heat sink layer. Furthermore, the heat sink layer locks the exchanging-coupling between the recording layer and the reproducing layer. Thus the present invention can transfer a magnetic domain from the recording layer to the reproducing layer through magnetostatic-coupling and also reduce in size a region of a reproducing layer receiving the magnetic domain transferred thereto.

Preferably, the magneto-optical recording medium including the heat sink layer provided in contact with the first reproducing layer and the recording layer and the second reproducing layer formed of a magnetic material having a magnetic domain enlarged by an external magnetic field, satisfies $(Pc \times Tex)/(p \times t) \leq 1$, wherein Tex represents a minimal film thickness required to block exchanging-coupling, Pc represents a heat conductivity of a material of the first reproducing layer higher than a heat conductivity of any other material of the first reproducing layer at room temperature, p represents a heat conductivity of a material of the heat sink layer at room temperature and t represents a thickness of the heat sink layer, t being larger than Tex.

In the present magneto-optical recording medium the heat sink layer diffuses more heat than the first reproducing layer. More specifically, when the magneto-optical recording medium is irradiated with a laser beam, the first reproducing layer stores heat, which is absorbed by the heat sink layer. Furthermore, the heat sink layer blocks the exchanging-coupling between the recording layer and the first reproducing layer. The first reproducing layer receives a magnetic domain transferred thereto, which is in turn transferred to the second reproducing layer through magnetostatic-coupling and also enlarged. Thus the present invention can reduce in size a region of the first reproducing layer receiving a magnetic domain transferred thereto and transfer a magnetic domain from the recording layer to the first reproducing layer with high resolution and also enlarge the transferred magnetic domain and detect the enlarged magnetic domain.

Preferably, the magneto-optical recording medium including the heat sink layer provided for the recording layer and the heat sink layer provided for the reproducing layer satisfies $(Pc \times Tex)/(p \times t) \leq 1$, wherein Tex represents a minimal film thickness required to block exchanging-coupling, Pc represents a heat conductivity of a material of the reproducing layer higher than a heat conductivity of any other material of the reproducing layer at room temperature, p represents a heat conductivity of a material of the second heat sink layer at room temperature and t represents a thickness of the second heat sink layer, t being larger than Tex.

In the present magneto-optical recording medium the second heat sink layer diffuses more heat than the reproducing layer. More specifically, when the magneto-optical recording medium is irradiated with a laser beam, the reproducing layer stores heat, which is absorbed by the second heat sink layer. Furthermore, the recording layer has a magnetic domain transferred to the reproducing layer through magnetostatic-coupling. Thus the present invention ensures that the heat stored in the reproducing layer is absorbed by the second heat sink layer. This can reduce in size a region of the reproducing layer receiving a magnetic domain transferred thereto.

Preferably, the magneto-optical recording medium including the heat sink layer provided for the recording layer, the heat sink layer provided for the reproducing layer, the first reproducing layer receiving a magnetic domain transferred from the recording layer, and the second reproducing layer receiving a magnetic domain transferred from the first reproducing layer, satisfies $(Pc \times Tex)/(p \times t) \leq 1$, wherein Tex represents a minimal film thickness required to block exchanging-coupling, Pc represents a heat conductivity of a material of the first reproducing layer higher than a heat conductivity of any other material of the first reproducing layer at room temperature, p represents a heat conductivity of a material of the second heat sink layer at room temperature and t represents a thickness of the second heat sink layer, t being larger than Tex.

In the present magneto-optical recording medium the second heat sink layer diffuses more heat than the first reproducing layer. More specifically, when magneto-optical recording medium is irradiated with a laser beam, the first reproducing layer stores heat, which is absorbed by the second heat sink layer. Furthermore, the recording layer has a magnetic domain transferred to the first reproducing layer through magnetostatic-coupling and in turn further transferred to the second reproducing layer through magnetostatic-coupling. In the second reproducing layer the transferred magnetic domain is enlarged and also detected. Thus the present invention can reduce in size a region of the first reproducing layer receiving a magnetic domain transferred thereto and transfer a magnetic domain from the recording layer to the first reproducing layer with high resolution and also enlarge the transferred magnetic domain and reproduce the enlarged magnetic domain.

Preferably, the magneto-optical recording medium including the heat sink layer provided in contact with the reproducing layer and opposite to the recording layer, satisfies $(Pc \times Tex)/(p \times t) \leq 1$, wherein Tex represents a minimal film thickness required to block exchanging-coupling, Pc represents a heat conductivity of a material of the reproducing layer higher than a heat conductivity of any other material of the reproducing layer at room temperature, p represents a heat conductivity of a material of the heat sink layer at room temperature and t represents a thickness of the heat sink layer, t being larger than Tex.

In the present magneto-optical recording medium the heat sink layer diffuses more heat than the reproducing layer. More specifically, when the magneto-optical recording medium is irradiated with a laser beam, the reproducing layer stores heat, which is absorbed by the heat sink layer. Furthermore, the recording layer has a magnetic domain transferred to the reproducing layer and the heat sink layer through magnetostatic-coupling. Thus the present invention ensures the heat stored in the reproducing layer is absorbed by the heat sink layer. Consequently the present invention can reduce in size a region of the reproducing layer receiving a magnetic domain transferred thereto and transfer a magnetic domain from the recording layer to the reproducing layer with high resolution and also detect the transferred magnetic domain with high signal intensity.

Preferably, the magneto-optical recording medium can have the heat sink layer provided in contact with the reproducing layer and the recording layer that is formed of a non-magnetic material.

When the present magneto-optical recording medium is irradiated with a laser beam, the reproducing layer stores heat, which is absorbed by the heat sink layer. Furthermore, the recording layer has a magnetic domain transferred to the reproducing layer via the heat sink layer through magnetostatic-coupling. As such in the present invention inserting a non-magnetic material between the reproducing layer and the recording layer allows the reproducing layer to emit heat and the recording layer and the reproducing layer to transfer a magnetic domain from the former layer to the latter layer through magnetostatic-coupling.

Preferably, the magneto-optical recording medium including the heat sink layer provided in contact with the first reproducing layer and the recording layer and the second reproducing layer formed of a magnetic material having a magnetic domain enlarged with an external magnetic field, can have the heat sink layer formed of a non-magnetic material.

When the present magneto-optical recording medium is irradiated with a laser beam, the first reproducing layer stores heat, which is absorbed by the heat sink layer. Furthermore, the recording layer has a magnetic domain transferred to the first reproducing layer via the heat sink layer through magnetostatic-coupling and in turn enlarged by an external magnetic field. As such in the present magneto-optical recording medium enlarging a magnetic domain to reproduce a signal a non-magnetic material can be inserted between the recording layer and the reproducing layer to allow the reproducing layer to emit heat and the recording layer and the reproducing layer to transfer a magnetic domain from the former layer to latter layer through magnetostatic-coupling.

Preferably, the magneto-optical recording medium including the first heat sink layer provided for the recording layer and the second heat sink layer provided for the reproducing layer, can have the second heat sink layer formed of a non-magnetic material.

When the present magneto-optical recording medium is irradiated with a laser beam, the recording layer stores heat, which is absorbed by the first heat sink layer, and the reproducing layer stores heat, which is absorbed by the second heat sink layer formed of a non-magnetic material. Furthermore, the recording layer has a magnetic domain transferred to the reproducing layer through magnetostatic-coupling. As such, using a non-magnetic material to form the heat sink layer provided for the reproducing layer, allows the heat of the reproducing layer to be absorbed and the recording layer and the reproducing layer to transfer a magnetic domain from the former layer to the latter layer through magnetostatic-coupling.

Preferably, the magneto-optical recording medium including the heat sink layer provided for the recording layer, the heating emitting layer provided for the reproducing layer, the first reproducing layer receiving a magnetic domain transferred from the recording layer, and the second reproducing layer receiving a magnetic domain transferred from the first reproducing layer, can have the second heat sink layer formed of a non-magnetic material.

When the present magneto-optical recording medium is irradiated with a laser beam, the recording layer stores heat, which is absorbed by the first heat sink layer, and the first reproducing layer stores heat, which is absorbed by the second heat sink layer formed of a non-magnetic material. Furthermore, the recording layer has a magnetic domain transferred to the first reproducing layer through magnetostatic-coupling and in turn further transferred to the second reproducing layer through magnetostatic-coupling. The magnetic domain transferred to the second reproducing layer is enlarged by an external magnetic field and thus detected. As such the magneto-optical recording medium enlarging a magnetic domain to reproduce a signal including the first heat sink layer provided for the first reproducing layer that is formed of a non-magnetic material, allows the heat of the first reproducing layer to be absorbed and the recording layer and the first reproducing layer to transfer a magnetic domain from the former layer to the latter layer through magnetostatic-coupling.

Preferably, the magneto-optical recording medium including the heat sink layer provided in contact with the reproducing layer and opposite to the recording layer, can have the heat sink layer formed of a non-magnetic material.

When the present magneto-optical recording medium is irradiated with a laser beam, the reproducing layer stores heat, which is absorbed by the heat sink layer formed of a non-magnetic material. As such, using a non-magnetic material to form the heat sink layer and providing it on the side receiving the laser beam allows a magnetic domain to be transferred from the recording layer to the reproducing layer with high resolution.

Preferably, the magneto-optical recording medium including the heat sink layer provided in contact with the reproducing layer and the recording layer, can have the heat sink layer formed of a magnetic material having a Curie temperature lower than a temperature allowing a signal to be reproduced.

When the present magneto-optical recording medium is irradiated with a laser beam, the reproducing layer stores heat, which is absorbed by the heat sink layer. When a temperature allowing a signal to be reproduced is reached, the heat sink layer is no longer magnetized. Thus in the present invention providing the heat sink layer formed of a magnetic material having a low Curie temperature allows the reproducing layer to emit heat and the recording layer and the reproducing layer to transfer a magnetic domain from the former layer to the latter layer through magnetostatic-coupling.

Preferably, the magneto-optical recording medium including the heating emitting layer provided in contact with the first reproducing layer and the recording layer and the second reproducing layer formed of a magnetic material allowing a magnetic domain to be enlarged by an external magnetic field, can have the heat sink layer formed of a magnetic material having a Curie temperature lower than a temperature allowing a signal to be reproduced.

When the present magneto-optical recording medium is irradiated with a laser beam, the first reproducing layer stores heat, which is absorbed by the heat sink layer. When a temperature allowing a signal to be reproduced is reached, in the heat sink layer is no longer magnetized, and a magnetic domain is transferred from the recording layer to the first reproducing layer through magnetostatic-coupling. Furthermore the magnetic domain is further transferred from the first reproducing layer to the second reproducing layer through magnetostatic-coupling. Thus in the present invention providing the magneto-optical recording medium enlarging a magnetic domain to reproduce a signal with the heat sink layer formed of a magnetic material having a low Curie temperature allows the first reproducing layer to emit heat and the recording layer and the first reproducing layer to transfer a magnetic domain from the former layer to the latter layer through magnetostatic-coupling.

Preferably, the magneto-optical recording medium including the heat sink layer provided for the recording layer and the heat sink layer provided for the reproducing layer can have the second heat sink layer formed of a magnetic material.

When the present magneto-optical recording medium is irradiated with a laser beam, the recording layer stores heat, which is absorbed by the first heat sink layer, and the reproducing layer stores heat, which is absorbed by the second heat sink layer formed of a magnetic material. Furthermore, the recording layer has a magnetic domain transferred to the reproducing layer through magnetostatic-coupling. Thus in the present invention the second heat sink layer provided in contact with the reproducing layer can be formed of a magnetic material. This can prevent the reproducing layer from having a degraded magnetic characteristic.

Preferably, the magneto-optical recording medium including the heat sink layer provided for the recording layer, the heating emitting layer provided for the reproducing layer, the first reproducing layer receiving a magnetic domain transferred from the recording layer, and the second reproducing layer receiving a magnetic domain transferred from the first reproducing layer, can have the second heat sink layer formed of a magnetic material.

When the present magneto-optical recording medium is irradiated with a laser beam, the recording layer stores heat, which is absorbed by the first heat sink layer, and the first reproducing layer stores heat, which is absorbed by the second heat sink layer formed of a magnetic material. Furthermore, the recording layer has a magnetic domain transferred to the first reproducing layer through magnetostatic-coupling and in turn further transferred to the second reproducing layer through masgnetostatic-coupling. coupling. In the second reproducing layer the magnetic domain is enlarged by an external magnetic field and thus detected. Thus in the present invention the magneto-optical recording medium enlarging a magnetic domain to reproduce a signal can be provided with the second heat sink layer provided in contact with the first reproducing layer that is formed of a magnetic material. This can prevent the first reproducing layer from having a degraded magnetic characteristic.

Preferably, the magneto-optical recording medium including the heat sink layer provided in contact with the reproducing layer and opposite to the recording layer, can have the heat sink layer formed of a magnetic material.

When the present magneto-optical recording medium is irradiated with a laser beam, the reproducing layer stores heat, which is absorbed by the heat sink layer formed of a magnetic material. The reproducing layer has in an in-plane direction thereof a steep temperature profile. As such, a magnetic domain is transferred from the recording layer via the non-magnetic layer to the reproducing layer through magnetostatic-coupling with high resolution. The magnetic domain transferred to the reproducing layer is further transferred to the heat sink layer through exchanging-coupling. Thus in the present invention the magnetic domain transferred to the reproducing layer with high resolution can be detected by the heat sink layer and the reproducing layer. Consequently a reproduced signal can be increased in intensity.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 2 is a table presenting conditions for forming a heat sink layer of the FIG. 1 magneto-optical recording medium;

DESCRIPTION OF THE PREFERRED EMBODIMENTS

Figure 1:
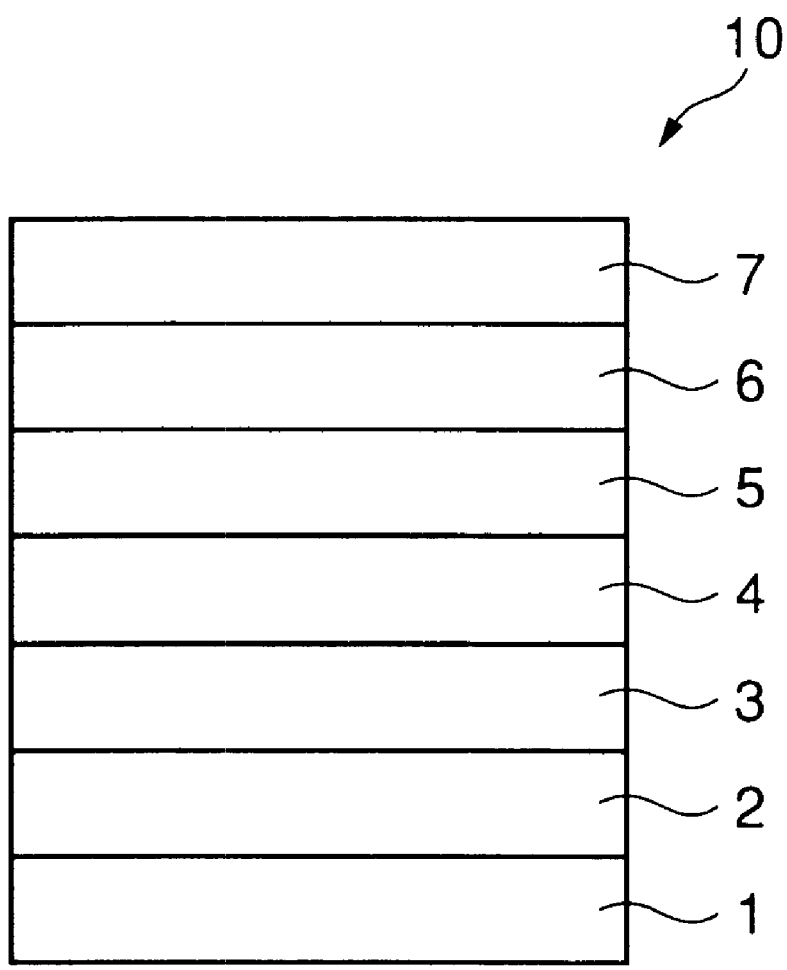
FIG. 1 shows a structure in cross section of a magneto-optical recording medium in accordance with the present invention.

The embodiments of the present invention will now be described more specifically with reference to the drawings. In the figures, like portions are labeled like reference characters and a description thereof will not be repeated.

With reference to FIG. 1, the present invention provides a magneto-optical recording medium 10 including a transparent substrate 1, an underlying layer 2, a reproducing layer 3, a heat sink layer 4, a recording layer 5, a protection layer 6, and a UV ray cured resin 7. Transparent substrate 1 is formed of a transparent material, such as glass, polycarbonate. Underlying layer 2 is formed of SiN. Underlying layer 2 is posed between transparent substrate 1 and reproducing layer 3, since reproducing layer 3 provided directly on transparent substrate 1 would have a degraded characteristic. Underlying layer 2 is also provided to allow more light to be reflected at an interface of underlying layer 2 and reproducing layer 3 to provide an improved magneto-optical signal reproduction characteristic.

Reproducing layer 3 is formed of GdFeCo. It is an in-plane magnetic film at room temperature and a vertically magnetic film when it exceeds 150° C. Heat sink layer 4 is formed of Al and functions to allow the heat resulting from laser beam radiation and stored in reproducing layer 3 to dissipate from reproducing layer 3. Heat sink layer 4 also functions to transfer each magnetic domain from recording layer 5 to reproducing layer 3 through magneto-static coupling. In other words, heat sink layer 4 functions to block the exchanging-coupling between recording layer 5 and reproducing layer 3.

Recording layer 5 is formed of TbFeCo. It is a vertically magnetic film at room temperature. Protection layer 6 is formed of SiN and it is provided to protect reproducing layer 3 and recording layer 5. UV ray cured resin 7 is provided to prevent magneto-optical recording medium 10 from having a magnetic layer, metal and the like oxidized and thus having a degraded characteristic. UV ray cured resin 7 is also provided to prevent the magnetic layer, metal and the like from being damaged.

Underlying layer 2 is 200 to 1000 Å thick, reproducing layer 3 is 100 to 1000 Å thick, reproducing layer 5 is 200 to 2000 Å thick and protection layer 6 is 50 to 1000 Å thick. Heat sink layer 4 may have any thickness that can block the exchanging-coupling between recording layer 5 and reproducing layer 3 and also allows a magnetic field leaking from recording layer 5 to reach reproducing layer 3. The magnetic field leaking from recording layer 5 depends on the thickness of recording layer 5 and the temperature of magneto-optical recording medium 10. As such, it is 200 Å when recording layer 5 has a thickness of 600 Å and magneto-optical recording medium 10 has a temperature of approximately 150° C. If in this condition a laser beam is directed and magneto-optical recording medium 10 is heated to approximately 150° C., then a magnetic field leaking from recording layer 5 and thus reaching reproducing layer 3 is maximized, reproducing layer 3 magnetized alters from an in-plane magnetic film to a vertically magnetic film, and recording layer 5 has each magnetic domain transferred to reproducing layer 3 through magneto-static coupling. UV ray cured resin 7 is 10 μm thick.

Typically, underlying layer 2 is 400 Å thick, reproducing layer 3 is 500 Å thick, heat sink layer 4 is 200 Å thick, reproducing layer 5 is 600 Å thick and protection layer 6 is 700 Å thick.

SiN forming underlying layer 2, GdFeCo forming reproducing layer 3, TbFeCo forming recording layer 5 and SiN forming protection layer 6 are sputtered under a well-known condition for forming them. UV ray cured resin 7 is applied by spin-coating.

Reference will now be made to FIG. 2 to describe conditions for preparing At forming heat sink layer 4. Al is sputtered, with a target corresponding to Al. Ar Gas is used as a sputtering gas and it has a flow rate of 40 to 80 sccm, typically 60 sccm. There are also applied a reaction pressure of 0.4 to 1.33 Pa, typically 0.93 Pa, a DC power of 0.5 to 2.5 W/cm$^2$, typically 1.13 W/cm$^2$, and a substrate temperature of 20 to 80° C., typically 60° C.

To maintain the films uniformly, underlying layer 2, reproducing layer 3, heat sink layer 4, recording layer 5 and protection layer 6 are sputtered with the substrate revolving at a rate of 20 to 50 rpm, typically 33 rpm.

Each material forming magneto-optical recording medium 10 has a heat conductivity at room temperature, as follows: SiN: 4.8 [W/m·K], Gd: 14 [W/m·K], Fe: 83.5 [W/m·K], Co: 100 [W/m·K], Al: 235 [W/m·K], Tb: 13 [W/m·K]. Thus, reproducing layer 3 formed of GdFeCo and recording layer 5 formed of TbFeCo at room temperature each has a heat conductivity smaller than the heat conductivity of Co, i.e., 100 [W/m·K], and At forming heat sink layer 4 can sufficiently sink the heat stored in reproducing layer 3 and recording layer 5. More specifically, if a material forming heat sink layer 4, stacked in contact with reproducing layer 3, is higher in heat conductivity than a material forming reproducing layer 3 that is higher in heat conductivity than any other material forming reproducing layer 3, a heat sink effect can be obtained in a direction perpendicular to the film's plane rather than an in-plane direction of the film. As such, if reproducing layer 3 is formed of GdFeCo then of the elements Co is the highest in heat conductivity and reproducing layer 3 does not have a heat conductivity exceeding the heat conductivity of Co, i.e., 100 [W/m·K], and heat sink layer 4 may be formed of any material that has a heat conductivity higher than that of Co, i.e., 100 [W/m·K].

Reproducing layer can be formed of various materials. If reproducing layer 3 is formed of GdFeCo with Al, Pt or a similar highly heat conductive element added thereto, with such an element added by several at. % reproducing layer 3 does not have a heat conductivity significantly depending on the amount of the added element; reproducing layer 3 would have a heat conductivity varying with the element added by at least 10 at. %.

If reproducing layer 3 and recording layer 5 are provided in contact with SiN extremely smaller in heat conductivity than reproducing layer 3 and recording layer 5, a significantly small heat sink effect is obtained in the direction to SiN. As such, forming in contact with reproducing layer 3 a heat sink layer 4 larger in heat conductivity than reproducing layer 3, allows the heat generated in reproducing layer 3 through laser beam radiation to be absorbed in a direction of a normal thereto, i.e., a direction in which heat sink layer 4 exists, more readily than in the direction of the film's plane. Consequently, reproducing layer 3 varies in temperature significantly in the direction of its film plane, reducing a region altering from an in-plane magnetic film to a vertically magnetic film and providing a clear boundary between the region altering as above and a region holding an in-plane magnetic film. Thus, magneto-optical recording medium 10 can have an improved signal reproduction characteristic.

Since heat sink layer 4 is provided also in contact with recording layer 5, heat sink layer 4 readily absorbs the heat generated in recording layer 5 through laser beam radiation in reproducing a signal. Thus information recorded in recording layer 5 is hardly erased. Furthermore, in recording information recording layer 5 has a temperature profile steep in the direction of its film plane, reducing a region heated exceeding the Curie temperature and also providing a clear boundary between the region exceeding the Curie temperature and a region not exceeding the Curie temperature. Thus an improved recording characteristic can be obtained. Furthermore, if between reproducing layer 3 and recording layer 5 there is inserted heat sink layer 4 formed of a magnetic material having a low Curie temperature allowing magnetization to disappear when it reaches a temperature allowing a signal to be reproduced, heat sink layer 4 can provide a heat sink effect as well as function to block the exchanging-coupling between reproducing layer 3 and recording layer 5. Furthermore, if heat sink layer 4 is formed of a transparent material, it can provide a heat sink effect as well as an enhancement effect, allowing light to be reflected between heat sink layer 4 and recording layer and interfere with light incident on reproducing layer 3 to provide a larger Kerr rotation angle.

Figure 3:
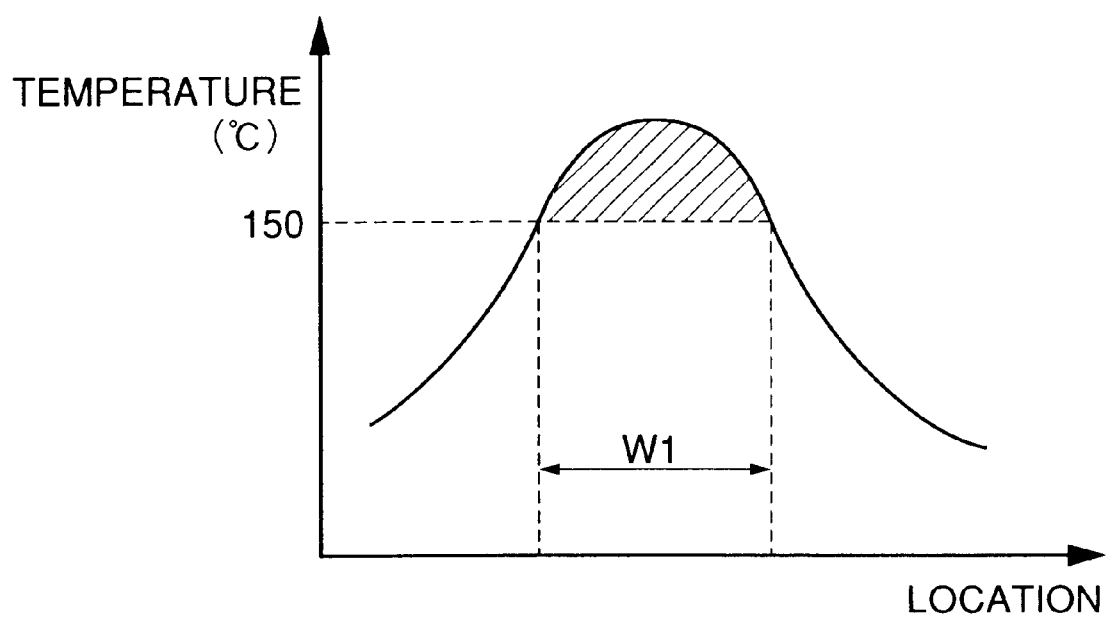
FIG. 3 shows a relationship between a laser beam profile in intensity and a region heated exceeding 150° C. for a magneto-optical recording medium excluding a heat sink layer.
Figure 4:
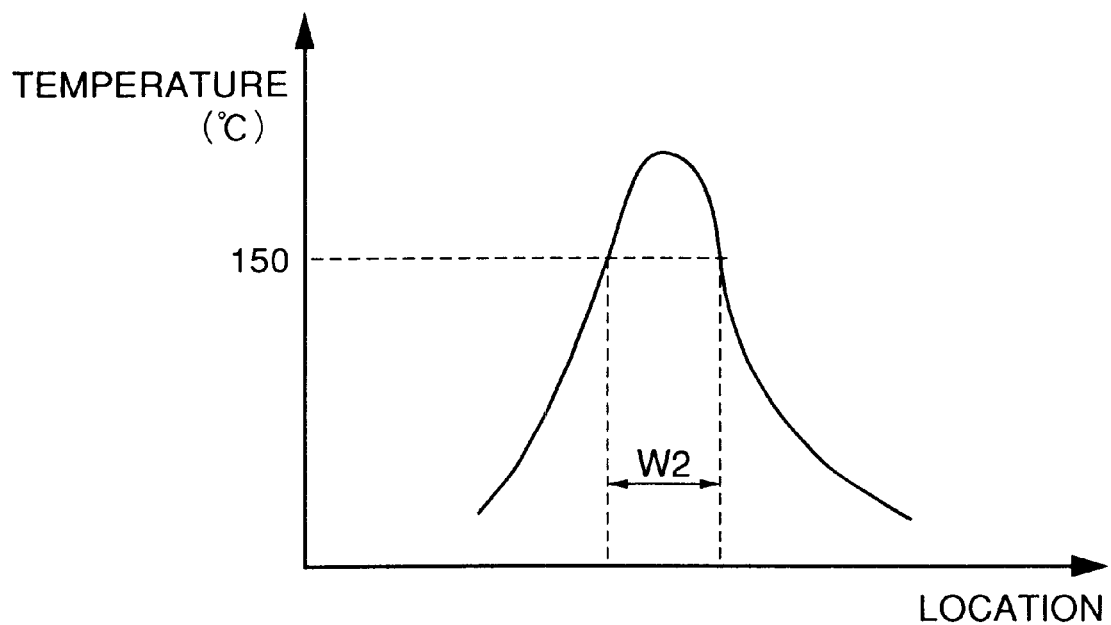
FIG. 4 shows a relationship between a laser beam profile in intensity and a region heated exceeding 150° C. for a magneto-optical recording medium excluding a heat sink layer.

Reference will now be made to FIGS. 3 and 4 to describe a temperature profile in magneto-optical recording medium 10. In general, a laser beam exhibits an intensity profile represented by a Gaussian distribution and when a laser beam having this intensity profile is directed to a magneto-optical recording medium excluding heat sink layer 4 a temperature profile is obtained as shown in FIG. 3, heating a region W1 to exceed 150° C. In other words, the reproducing layer in the W1 region alters from an in-plane magnetic film to a vertically magnetic film.

In contrast, when a laser beam having an intensity profile corresponding to a Gaussian distribution is directed to magneto-optical recording medium 10, heat sink layer 4 absorbs heat from reproducing layer 3 and recording layer 5 and the recording medium 10 temperature elevates and drops rapidly. As a result, as shown in FIG. 4, a region W2 is heated to exceed 150° C. It is apparent that region W2 is narrower than region W1 and in magneto-optical recording medium 10 at reproducing layer 3 region W2 alters from an in-plane magnetic film to a vertically magnetic film. Thus in a magneto-optical recording medium 10 a magnetic domain transferred from recording layer 5 is detected in reproducing layer 3 at a narrower region than in the magneto-optical recording medium excluding heat sink layer 4. Thus the high-density magneto-optical recording medium using a small magnetic domain to record a signal can have an improved signal reproduction characteristic.

Figure 5A:
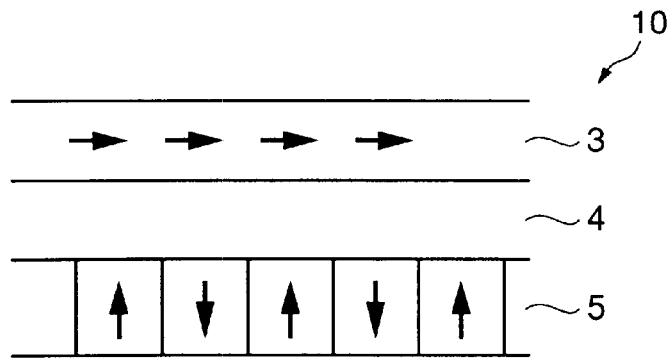
FIG. 5A is a cross section showing an initial condition in reproducing a signal from the FIG. 1 magneto-optical recording medium.
Figure 5B:
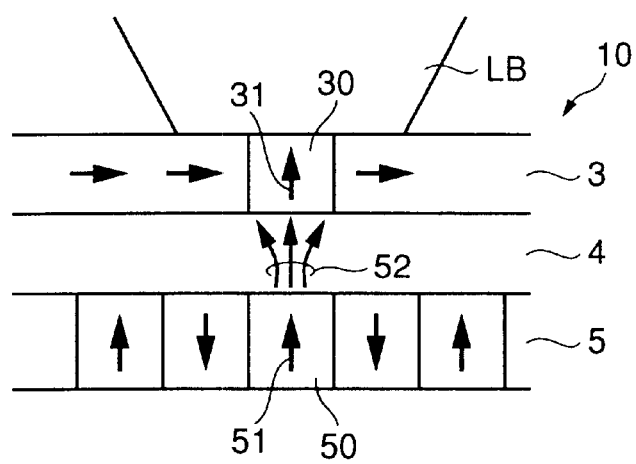
FIG. 5B is a cross section showing a magnetic domain transferred from a recording layer to a reproducing layer in reproducing a signal from the FIG. 1 magneto-optical recording medium.
Figure 5C:
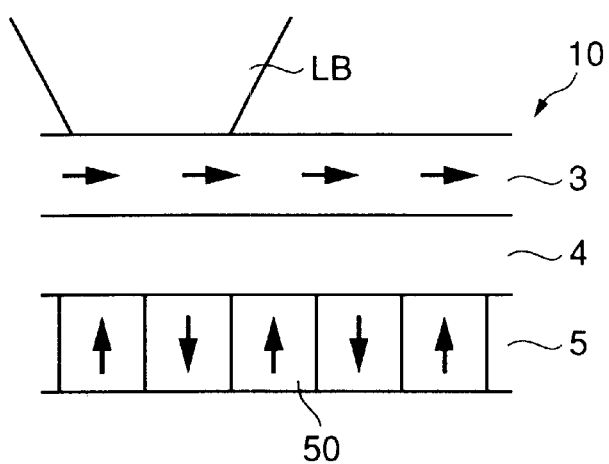
FIG. 5C is a cross section showing the initial condition again provided after a magnetic domain transferred to a reproducing layer has been detected in reproducing a signal from the FIG. 1 magneto-optical recording medium.

Reference will now be made to FIGS. 5A–5C to describe a process of reproducing a signal from magneto-optical recording medium 10. As shown in FIG. 5A, in an initial condition reproducing layer 3 is in-plane magnetized and recording layer 5 has a magnetic domain magnetized, modulated by a signal to be recorded. When magneto-optical recording medium 10 thus magnetized is irradiated with a laser beam LB on the reproducing layer 3 side, in recording layer 5 a region corresponding to a magnetic domain 50 is heated exceeding 150° C., and a magnetic field 52 leaking from magnetic domain 50 is also intensified. Reproducing layer 3 is also heated and, as has been described previously, only a region thereof corresponding to region W2 is heated exceeding 150° C. and thus alters from an in-plane magnetic film to a vertically magnetic film.

Since magnetic field 52 making from the recording layer's magnetic domain 50 reaches the region of reproducing layer 3 exceeding 150° C., there is provided in reproducing layer 3 a magnetic domain 30 magnetized 31 in the same direction as magnetic domain 50 is magnetized 51, as shown in FIG. 5B. Thus, the recording layer's magnetic domain 50 is transferred to reproducing layer 3 through magneto-static coupling. Magnetic domain 30 transferred to reproducing layer 3 is detected by laser beam LB directed thereto and the recording layer's magnetic domain 50 is thus reproduced.

Thereafter when laser beam LB moves and the reproducing layer's magnetic domain 30 region drops in temperature it readily alters from a vertically magnetic film to an in-plane magnetic film and magnetic field 52 leaking from the recording layer's magnetic domain 50 is also reduced in intensity. Thus, magneto-optical recording medium 10 returns to the same condition as the initial condition, as shown in FIG. 5C. The process shown in FIGS. 5A–5C is repeated to transfer each magnetic domain from recording layer 5 to reproducing layer 3 and reproduce the magnetic domain.

Heat sink layer 4 may be formed of a material other than Al that is larger in heat conductivity than reproducing layer 3 and recording layer 5. Preferably the material has a heat conductivity larger than that of Co at room temperature, i.e., 100 [W/m·K], since reproducing layer 3 and recording layer 5, provided in contact with heat sink layer 4, are formed of GdFeCo and TbFeCo, respectively, and of the elements Co has the highest heat conductivity. More specifically, Al may be replaced by Zn of 119 [W/m·K] in heat conductivity at room temperature, W of 170 [W/m·K] in heat conductivity at room temperature, Mg of 153 [W/m·K] in heat conductivity at room temperature, Be of 220 [W/m·K] in heat conductivity at room temperature, Cu of 401 [W/m·K] in heat conductivity at room temperature, Au of 318 [W/m·K] in heat conductivity at room temperature, Ag of 428 [W/m·K] in heat conductivity at room temperature, or an alloy of at least one of the above metals and Al. Furthermore, heat sink layer 4 is not limited to a metal film and it may be a non-metal, such as graphite, silicon (Si) and the like, that is higher in heat conductivity than reproducing layer 3. If heat sink layer 4 is formed of a transparent material such as Si, it can have a heat sink effect and also provide the aforementioned enhancement effect in reproducing a signal.

While magneto-optical recording medium 10 has heat sink layer 4 corresponding to Al of 200 Å in thickness, if heat sink layer 4 is formed of a material larger in heat conductivity than Al, then heat sink layer 4 having a thickness less than 200 Å still can achieve an equivalent heat sink effect. As such, heat sink layer 4 is required to have a thickness Tex of at least 20 Å, which can block exchanging-coupling, and a heat conductivity larger than a heat conductivity Pc of Co at room temperature, i.e., Pc=100 [W/m·K]. If heat sink layer 4 is formed of a material having a heat conductivity p [W/m·K] at room temperature and a thickness t [Å], wherein t≧20 Å, then a coefficient of thermal diffusion Pc×Tex/ (p×t) may be of any value no more than one. In other words, heat sink layer 4 with its thickness considered is required to diffuse more heat than Co does.

While in the above description heat sink layer 4 has thickness t and heat conductivity p satisfying Pc×Tex/ (p×t) ≦1, the reference for comparison or heat conductivity Pc is not limited to that of Co and may be that of another element. In general, it corresponds to that of a material forming reproducing layer 3 which is the highest of those of the materials forming reproducing layer 3.

Furthermore, reproducing layer 3 may be formed of a material other than GdFeCo and it may alternatively be formed of an alloy of GdFeCo and at least one of the elements Nd, Pr, Pt and Pd or a film of noble metal and transition metal stacked in layers such as Pt/Co. Using such materials to form reproducing layer 3 can increase a Kerr rotation angle relative to a laser beam of as short a wavelength as approximately 400 nm and thus provide an improved magneto-optical signal reproduction characteristic.

Figure 6:
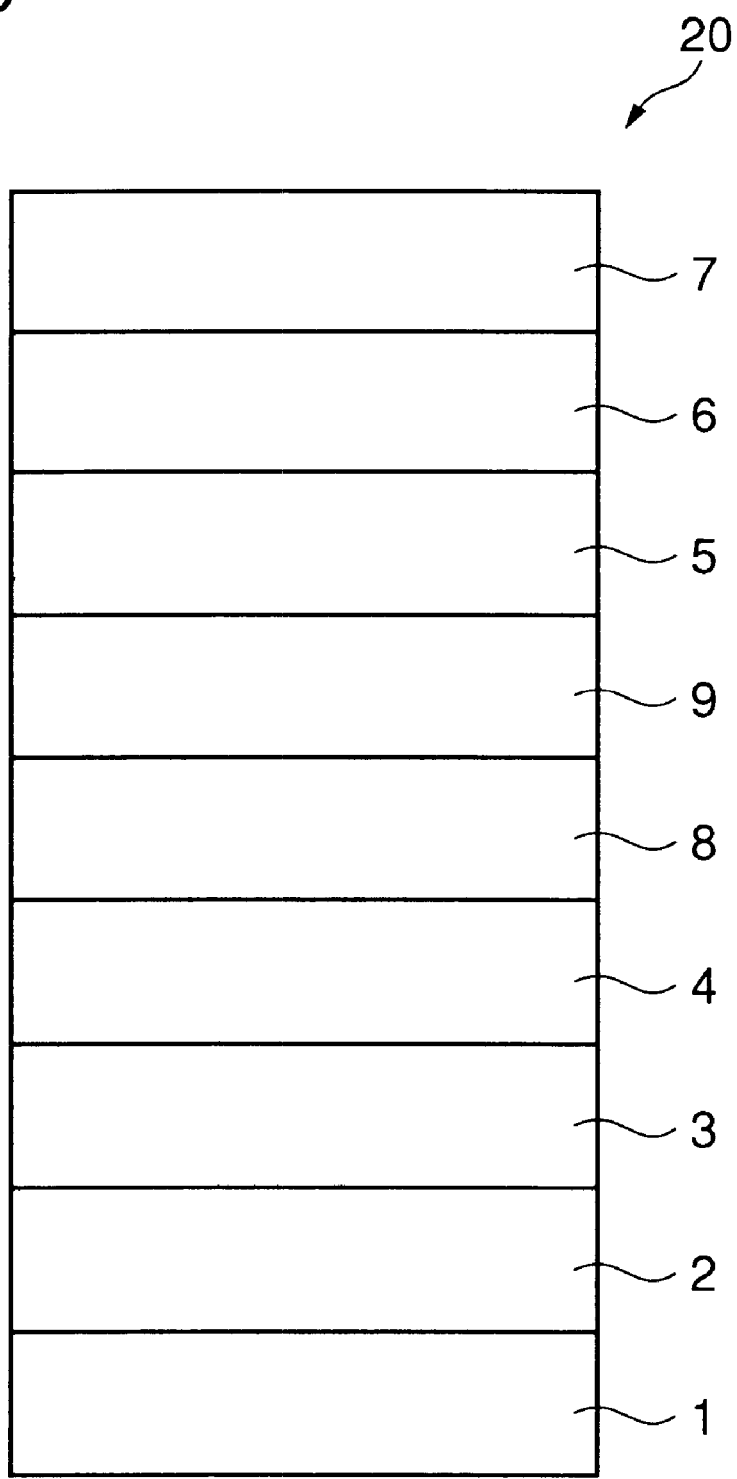
FIG. 6 shows another structure in cross section of the magneto-optical recording medium in accordance with the present invention.

The present magneto-optical recording medium may be a magneto-optical recording medium 20 as shown in FIG. 6. Magneto-optical recording medium 20 corresponds to magneto-optical recording medium 10 plus a dielectric layer 8 and a heat sink layer posed between heat sink layer 4 and recording layer 5. Dielectric layer 8 is provided in contact with heat sink layer 4 and heating emitting layer 9 is provided in contact with recording layer 5. Dielectric layer 8 is formed of SiN and heat sink layer 9 is formed of Ag. Magneto-optical recording medium 20 can have heat sink layer 4, provided in contact with reproducing layer 3, reduced in thickness and also increase laser beam reflection at an interface of heat sink layer 4 and dielectric layer 8. Thus there can be provided a further improved magneto-optical signal reproduction characteristic. Heat sink layer 4 has a thickness of 20 to 1000 Å, typically 100 Å. Dielectric layer 8 has a thickness of 20 to 1000 Å, typically 100 Å. It should be noted, however, that a magnetic field leaking from recording layer 5 is required to reach reproducing layer 3 through dielectric layer 8 and heat sink layer 9.

To prevent dielectric layer 8 from preventing recording layer 5 from enjoying heat sink effect, magneto-optical recording medium 20 is provided with heat sink layer 9 provided in contact with recording layer 5. Thus, the heat generated in recording layer 5 can be absorbed by heat sink layer 9 to provide a steep temperature profile to recording layer 5 in the direction of its film plane.

Figure 7:
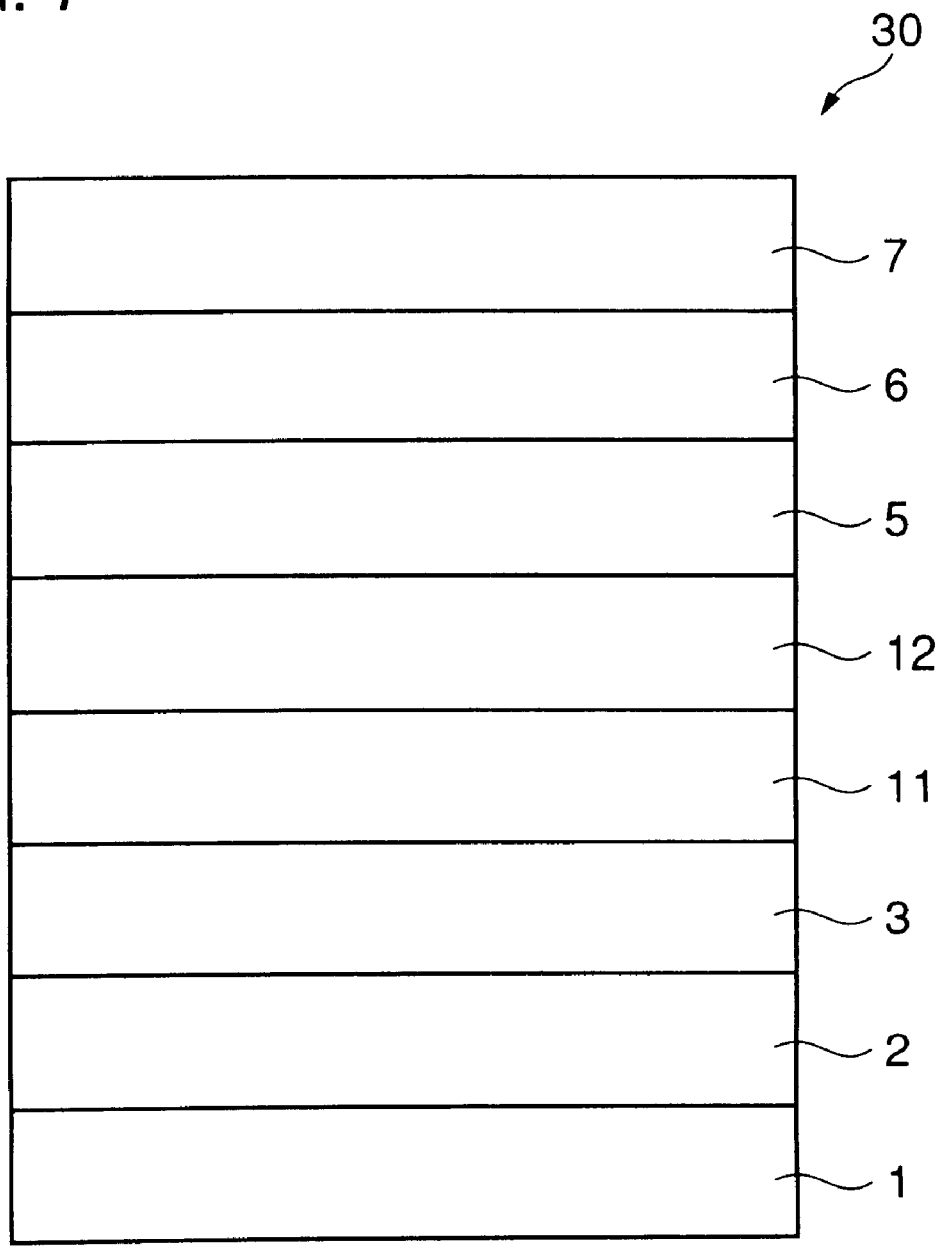
FIG. 7 shows still another structure in cross section of the magneto-optical recording medium in accordance with the present invention.

The present magneto-optical recording medium may be a magneto-optical recording medium 30 as shown in FIG. 7. Magneto-optical recording medium 30 corresponds to magneto-optical recording medium 10 with heat sink layer 4 replaced by a heat sink layer 11 plus a dielectric layer 12 posed between heat sink layer 11 and recording layer 5.

Heat sink layer 11 is formed of a magnetic material higher in heat conductivity than reproducing layer 3. More specifically, heat sink layer 11 is formed of an alloy of PtCo. Heat sink layer 11 has a thickness of 20 to 1000 Å, typically 150 Å. PtCo forming heating emitting layer 11 maintains in-plane magnetization when it has a temperature ranging from room temperature to a Curie temperature of 140° C.

Dielectric layer 12 is provided to block the exchanging-coupling of recording layer 5 and heat sink layer 11. Dielectric layer 12 is formed of a non-magnetic material such as Al, SiN or the like. Dielectric layer 12 has a thickness of 10 to 1000 Å, typically 50 Å.

Heat sink layer 11 is formed by sputtering the alloy of PtCo and dielectric layer 12 is formed by sputtering Al, SiN or the like.

Figure 8A:
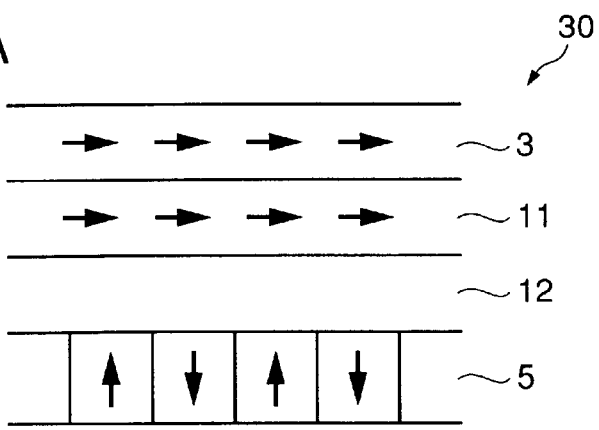
FIG. 8A is a cross section showing an initial condition in reproducing a signal from the FIG. 7 magneto-optical recording medium.
Figure 8B:
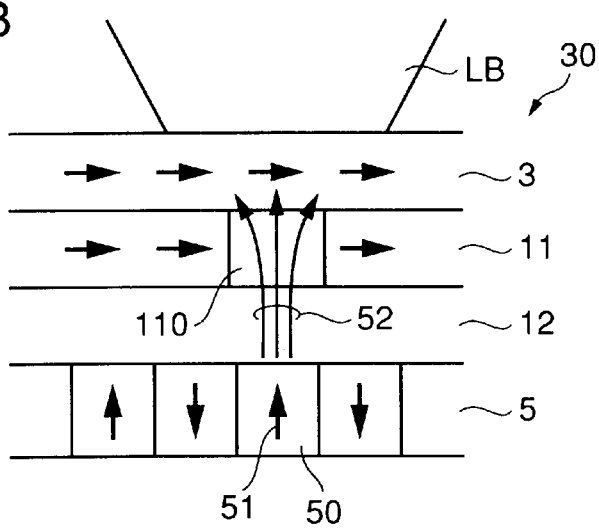
FIG. 8B is a cross section showing a heat sink layer no longer magnetized and a magnetic field leaking from a recording layer and extending and thus reaching a reproducing layer in reproducing a signal from the FIG. 7 magneto-optical recording medium.
Figure 8C:
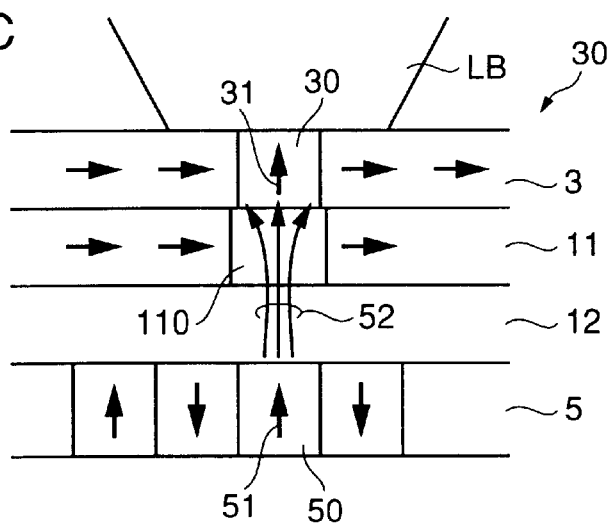
FIG. 8C is a cross section showing a magnetic domain transferred from a recording layer to a reproducing layer in reproducing a signal from the FIG. 7 magneto-optical recording medium.

Reference will now be made to FIGS. 8A–8C to describe a process of reproducing a signal from magneto-optical recording medium 30. As shown in FIG. 8A, magneto-optical recording medium 30 in an initial condition has reproducing layer 3 and heat sink layer 11 both in-plane magnetized and recording layer 5 magnetized modulated by a signal to be recorded.

When magneto-optical recording medium 30 thus magnetized is irradiated with laser beam LB on the reproducing layer 3 side, magneto-optical recording medium 30 is heated and heat sink layer 11 has a region 110 heated exceeding 140° C. and thus no longer magnetized. Furthermore, a magnetic field 52 leaking from the recording layer's magnetic domain 50 is intensified as temperature increases, and magnetic field 52 thus extends through dielectric layer 12 and the heat sink layer 11 region 110 no longer magnetized and thus reaches reproducing layer 3, as shown in FIG. 8B. Since magneto-optical recording medium 30 has a temperature lower than 150° C., reproducing layer 3 remains in-plane magnetized.

When magneto-optical recording medium 30 is heated exceeding 150° C., magnetic field 52 leaking from the recording layer's magnetic domain 50 can further be intensified and reproducing layer 3 can also alter from an in-plane magnetic film to a vertically magnetic film. Consequently in reproducing layer 3 at a region heated exceeding 150° C. magnetic field 52 leaking from the recording layer's magnetic domain 50 changes an in-plane magnetic film to vertical magnetization 31 provided in the same direction as magnetization 51 of magnetic domain 50. Thus a magnetic domain 30 is formed in reproducing layer 3. Magnetic domain 30 is detected by laser beam LB and the recording layer's magnetic domain 50 is thus reproduced, as shown in FIG. 8C.

Thereafter, when laser beam LB moves and the magnetic domain 30 region drops in temperature, reproducing layer 3 and heat sink layer 11 maintain in-plane magnetization and magnetic field 52 leaking from the recording layer's magnetic domain 50 is also reduced in intensity and the recording medium returns to the initial condition, as shown in FIG. 8A. The process as shown in FIGS. 8A–8C is repeated to reproduce each domain of recording layer 5.

Since heat sink layer 11 at room temperature to 140° C. maintains in-plane magnetization, heat sink layer 11 in this range of temperature exchanging-couples with reproducing layer 3 and thus prevents a magnetic field leaking from each magnetic domain of recording layer 5 from reaching reproducing layer 3. When magneto-optical recording medium 30 is heated exceeding 140° C., heat sink layer 11 is partially no longer magnetized and a magnetic field leading from each magnetic domain of recording layer 5 extends through non-magnetic, dielectric layer 12 and the heat sink layer 11 region 110 no longer magnetized and thus reaches reproducing layer 3. As such, heat sink layer 11 or dielectric layer 12 does not have a thickness determined independently: their totaled thickness must be a thickness that can block the exchanging-coupling from recording layer 5 to reproducing layer 3, although extremely reducing the thickness of heat sink layer 11 while increasing that of dielectric layer 12 would reduce the heat sink effect of heat sink layer 11 on reproducing layer 3 and heat sink layer 11 is thus required to have a thickness allowing reproducing layer 3 to sufficiently enjoy the heat sink effect.

If a heat sink layer formed of magnetic film is used in a magneto-optical recording medium, heat sink layer 11 may be provided at a position other than that between reproducing layer 3 and recording layer 5, and it may be provided between underlying layer 2 and reproducing layer 3, although heat sink layer 11 is required to be a magnetic film larger in heat conductivity than reproducing layer 3 and altering to a vertically magnetic film when it exceeds 150° C., at which temperature a magnetic domain is transferred from recording layer 5. More specifically, heat sink layer 11 is formed of an alloy of PtCo or a film of Pt/Co stacked in layers.

If heat sink layer 11 formed of the PtCo alloy is inserted between underlying layer 2 and reproducing layer 3, heat sink layer 11 increases the content of Pt more than a PtCo alloy reaching a Curie temperature when it exceeds 140° C. As such, heat sink layer 11 is magnetized when it has a temperature allowing a signal to be reproduced, and as well as reproducing layer 3 it alters to a vertical magnetic film.

Figure 9:
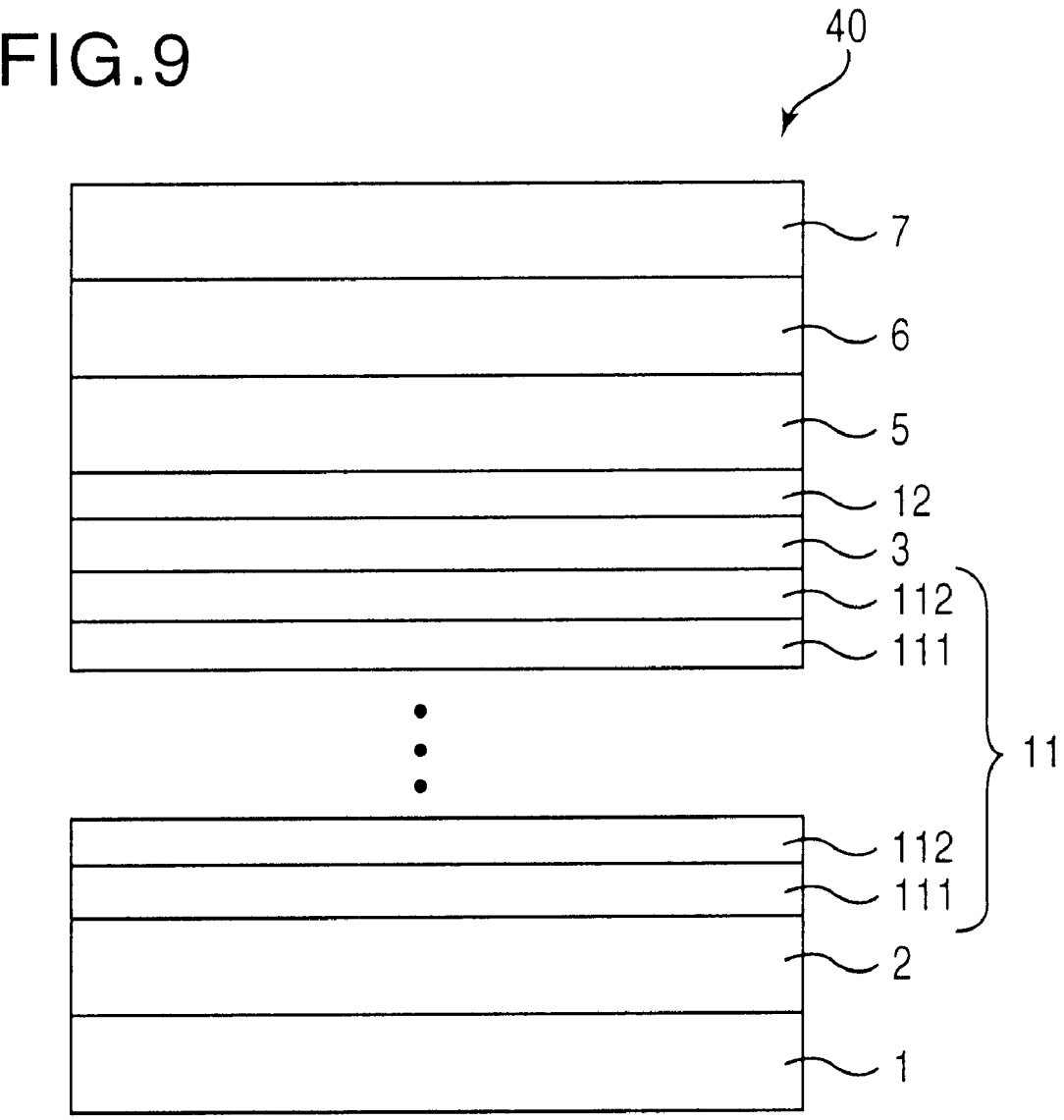
FIG. 9 shows still another structure in cross section of the magneto-optical recording medium in accordance with the present invention.

FIG. 9 shows a structure in cross section of a magneto-optical recording medium 40 having heat sink layer 11 formed of a film of Pt/Co stacked in layers. Heat sink layer 11 corresponds to a Pt layer 112 and a Co layer 111 that are stacked in layers alternately by two periods. A single Pt layer 112 is 15 Å thick and a single Co layer 111 is 5 Å thick. The stacked-layered film has a total thickness of 40 Å.

Magneto-optical recording medium 40 preferably has Pt layer 112 provided in contact with reproducing layer 3, since Pt is larger in heat conductivity than Co.

If a magneto-optical recording medium includes PtCo, a film of Pt/Co stacked in layers or the like serving as heat sink layer 11 provided between underlying layer 2 and reproducing layer 3, it can provide a large Kerr rotation angle relative to a laser beam of as short a wavelength as approximately 400 mm and hence an increased intensity of a reproduced signal. Thus, in addition to heat sink layer 11 providing a heat sink effect, a signal can be reproduced with high signal intensity. Thus there can be provided an improved signal reproduction characteristic.

Figure 10:
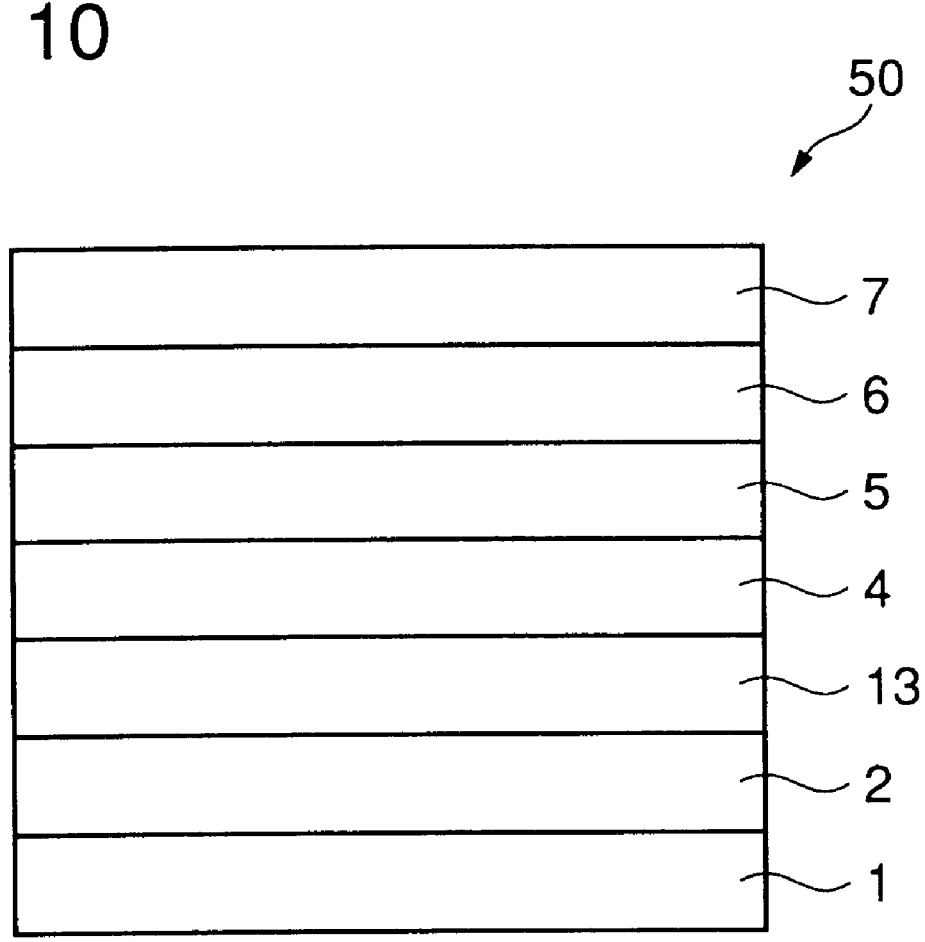
FIG. 10 shows still another structure in cross section of the magneto-optical recording medium in accordance with the present invention.

The present magneto-optical recording medium may alternatively be a magneto-optical recording medium 50 as shown in FIG. 10. Magneto-optical recording medium 50 corresponds to magneto-optical recording medium 10 with reproducing layer 3 replaced by an enlarging and reproducing layer 13. For magneto-optical recording media 10–40, each magnetic domain of recording layer 5 is transferred through magnetostatic-coupling to a region of reproducing layer 3 smaller than a laser beam spot diameter and the transferred magnetic domain is detected by the laser beam to reproduce a signal, which technique is referred to as the MSR technique. In contrast, in magneto-optical recording medium 50 each magnetic domain of recording layer 5 is transferred to reproducing layer 3 through magnetostatic-coupling, as in magneto-optical recording media 10–40, and the transferred magnetic domain is enlarged to reproduce a signal.

Enlarging and reproducing layer 3 is formed of GdFeCo. Enlarging and reproducing layer 3 is formed of the same material as reproducing layer 3 of magneto-optical recording medium 10, although they are different in composition. More specifically, enlarging and reproducing layer 13 is formed of GdFeCo containing more FeCo than reproducing layer 3. Enlarging and reproducing layer 13 maintains vertical magnetization when it has a temperature ranging from room temperature to a Curie temperature of approximately 300° C. Enlarging and reproducing layer 13 has a thickness of 150 to 500 Å, typically 300 Å.

Figure 11A:
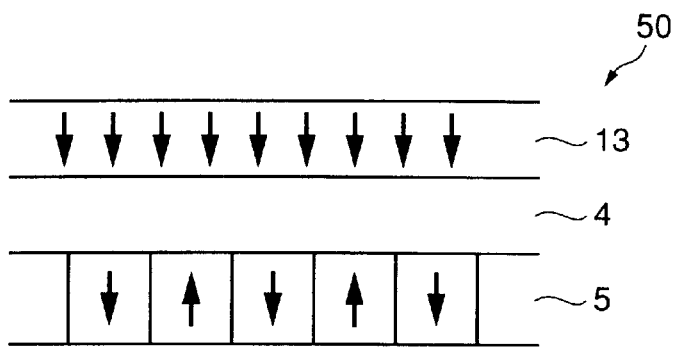
FIG. 11A is a cross section showing an initial condition in reproducing a signal from the FIG. 10 magneto-optical recording medium.
Figure 11B:
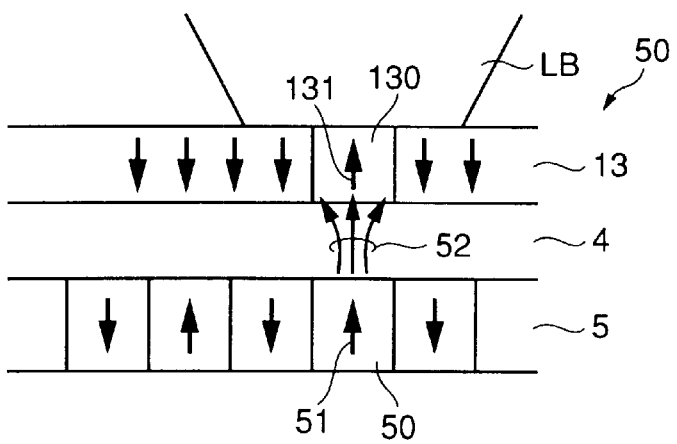
FIG. 11B is a cross section showing a magnetic domain transferred from a recording layer to a reproducing layer in reproducing a signal from the FIG. 10 magneto-optical recording medium.
Figure 11C:
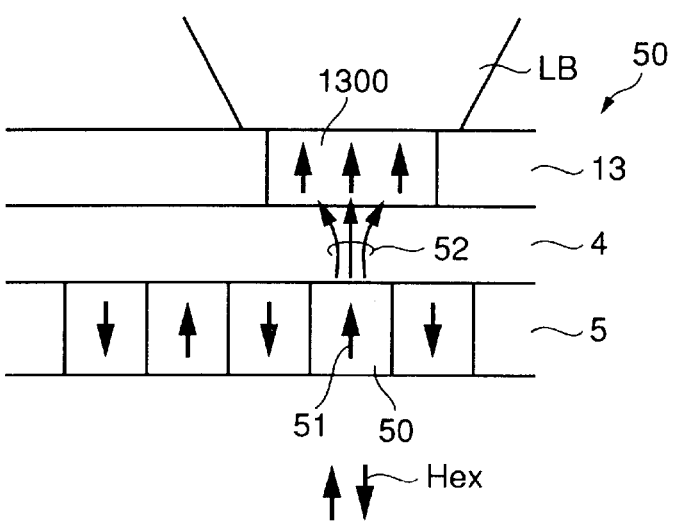
FIG. 11C is a cross section showing a magnetic domain transferred to a reproducing layer that is enlarged by an external magnetic field in reproducing a signal from the FIG. 10 magneto-optical recording medium.

Reference will now be made to FIGS. 11A–11C to describe a process of reproducing a signal from magneto-optical recording medium 50. FIG. 11A shows an initial condition in which enlarging and reproducing layer 13 is initially magnetized, initialized in a predetermined direction, and recording layer 5 is magnetized modulated by a signal to be recorded. When magneto-optical recording medium 50 thus magnetized is irradiated with laser beam LB on the enlarging and reproducing layer 13 side, magneto-optical recording medium 50 is heated and magnetic field 52 leaking from the recording layer's magnetic domain 50 is intensified. Responsively, in enlarging and reproducing layer 13 at a heated region magnetization is inverted by magnetic field 52 leaking from the recording layer's magnetic domain 50 and there appears in enlarging and reproducing layer 13 a magnetic domain 130 magnetized 131 in the same direction as magnetic domain 50 is magnetized 51, as shown in FIG. 11B.

Then, when an external alternate magnetic field Hex is applied, magnetic domain 130 is enlarged to a magnetic domain 1300 at a timing at which a magnetic field of alternate magnetic field Hex having the same direction as magnetization 131 is applied, and magnetic domain 130 disappears at a timing at which a magnetic field of alternate magnetic field Hex having the opposite direction to magnetization 131 is applied. Thus, applying alternate magnetic field Hex allows enlarging and reproducing layer 13 to have the enlargement of magnetic domain 130 to magnetic domain 1300 and the disappearance of magnetic domain 130 that are synchronized with alternate magnetic field Hex. As such, at a timing at which magnetic domain 130 is enlarged to magnetic domain 1300 the enlarged magnetic domain 1300 is detected by laser beam LB. Thus the recording layer's magnetic domain 50 is enlarged and thus reproduced, as shown in FIG. 11C.

Thereafter when laser beam LB moves and the magnetic domains 50 and 30 regions drop in temperature the recording medium returns to the initial condition, as shown in FIG. 11A. The process as shown in FIGS. 11A–11C is repeated to transfer each magnetic domain from recording layer 5 to enlarging and reproducing layer 13 and enlarge and thus reproduce the magnetic domain.

Figure 12:
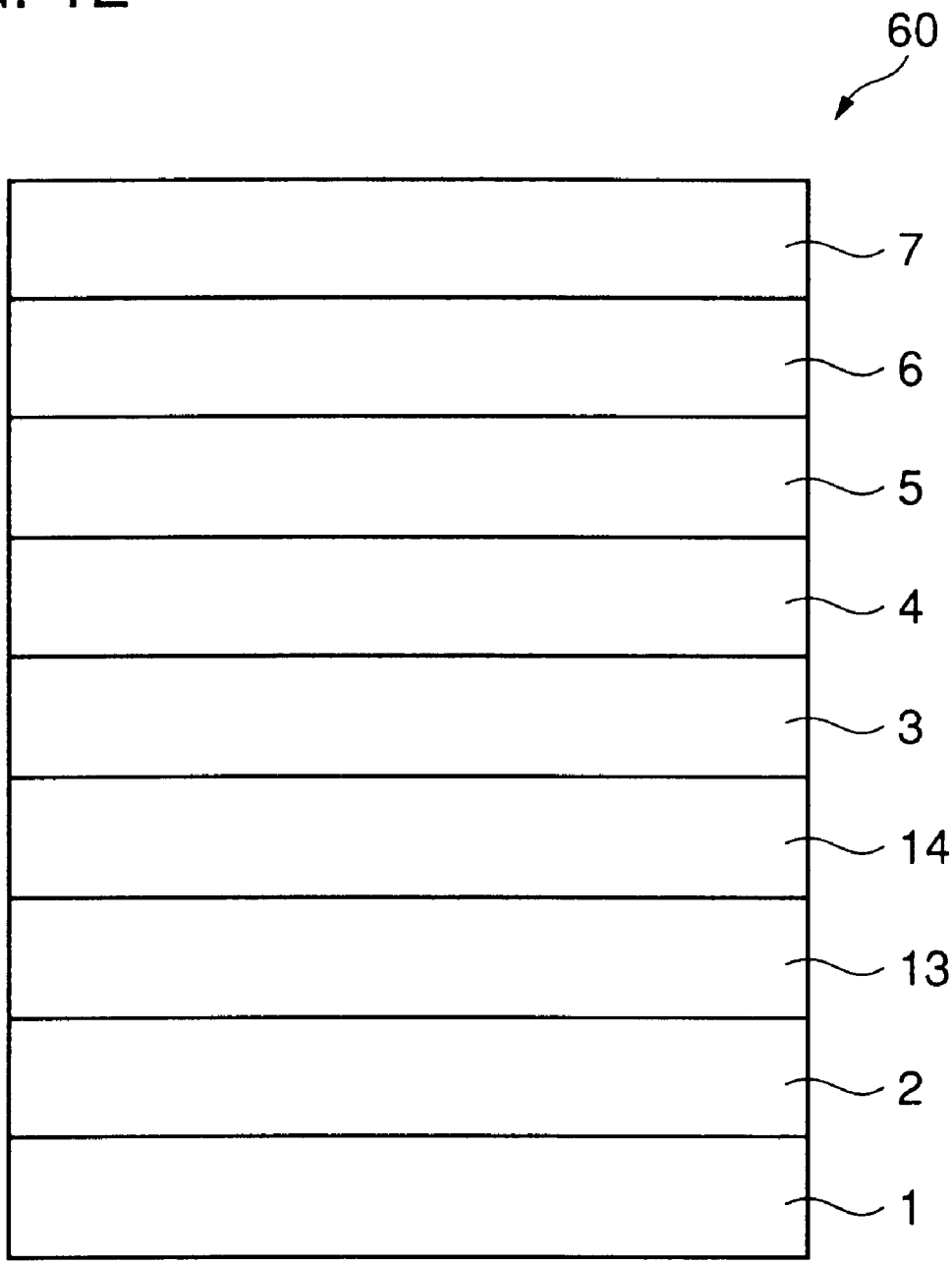
FIG. 12 shows still another structure in cross section of the magneto-optical recording medium in accordance with the present invention.

A magneto-optical recording medium employing enlarging a magnetic domain to reproduce a signal may be a magneto-optical recording medium 60 as shown in FIG. 12. Magneto-optical recording medium 60 corresponds to magneto-optical recording medium 10 plus enlarging and reproducing layer 13 and dielectric layer 14 posed between underlying layer 2 and reproducing layer 3. Enlarging and reproducing layer 13 is formed of GdFeCo and has the same composition and thickness as magneto-optical recording medium 50. Dielectric layer 14 is formed of SiN and has a thickness of 20 to 300 Å, typically 50 Å.

Figure 13:
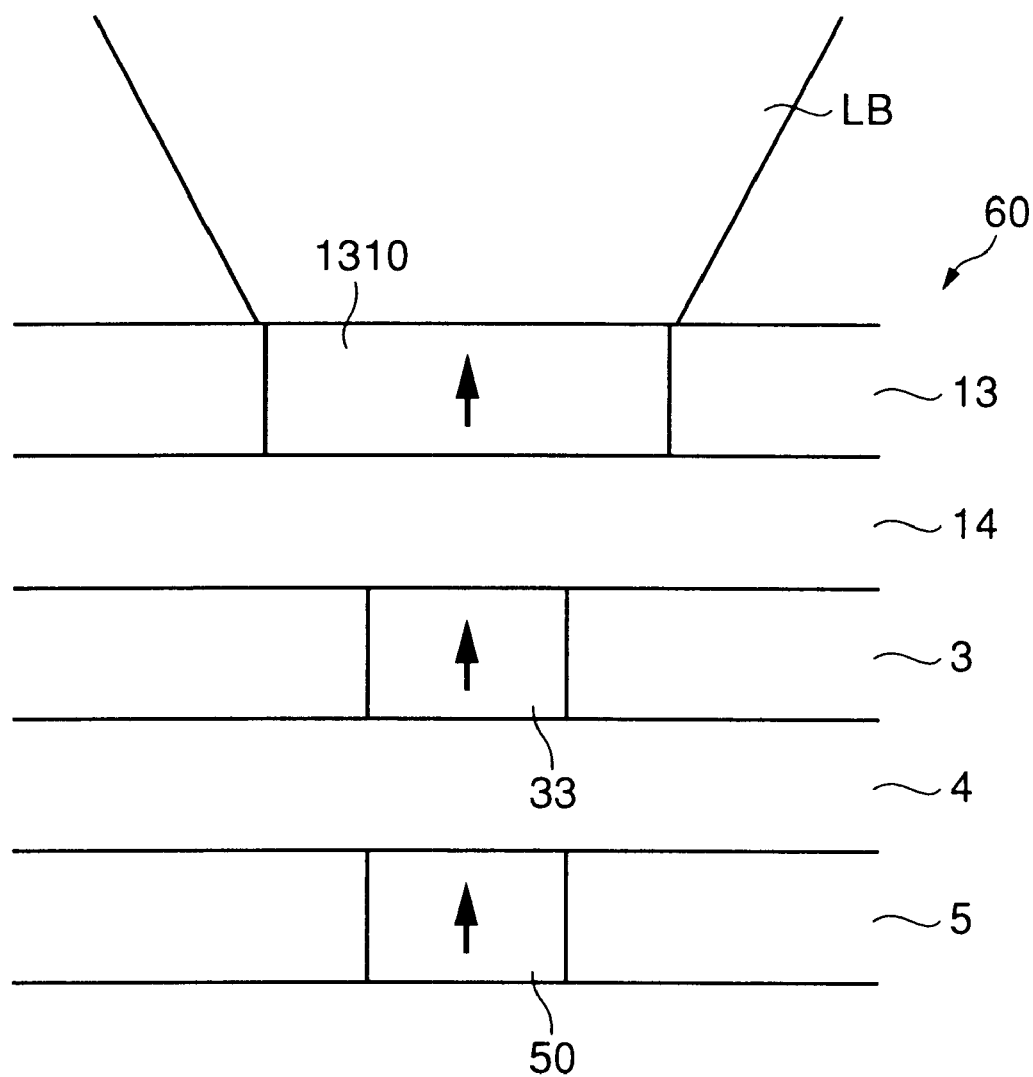
FIG. 13 is a cross section for illustrating a heat emitting process in the FIG. 12 magneto-optical recording medium.
Figure 14:
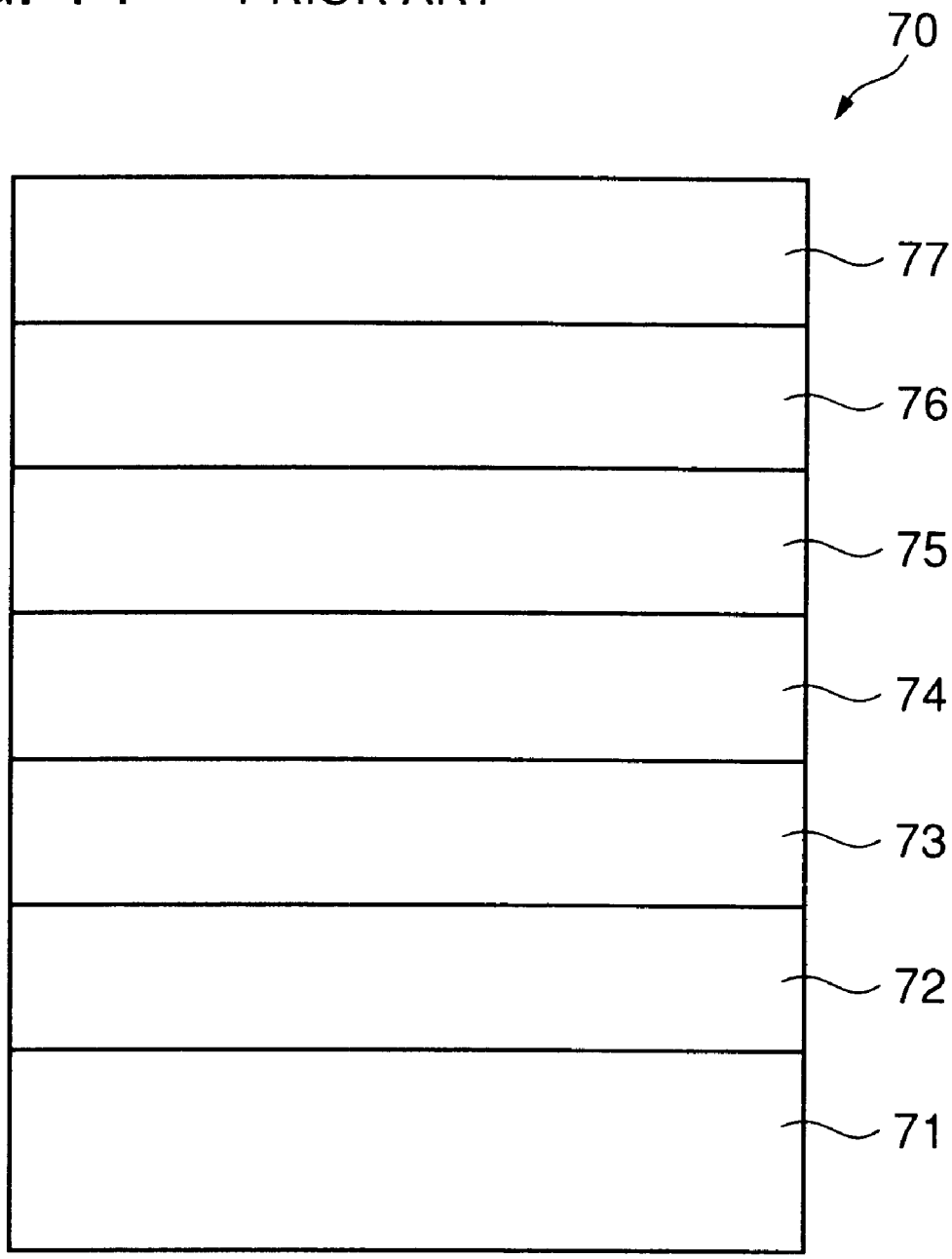
FIG. 14 shows a structure in cross section of a conventional magneto-optical recording medium.

With reference to FIG. 13, when magneto-optical recording medium 60 is irradiated with laser beam LB on the enlarging and reproducing layer 13 side, with enlarging and reproducing layer 13 larger in heat conductivity than the dielectric layer 14, the heat generated by the laser beam diffuses in enlarging and reproducing layer 13 in an in-plane direction thereof. Reproducing layer 3 receives heat, which diffuses into heat sink layer 4. Consequently, reproducing layer 3 is heated exceeding 150° C. at a region 33 narrower than a region 1310 of enlarging and reproducing layer 13. Thus, the recording layer's magnetic domain 50 is transferred to reproducing layer 3 as a magnetic domain 33 via heat sink layer 4 through magnetostatic-coupling. Magnetic domain 33 is transferred to enlarging and reproducing layer 13 as magnetic domain 1310 via dielectric layer 14 through magnetostatic-coupling. Enlarged magnetic domain 1310 is detected by laser beam LB. Thus the recording layer's magnetic domain 50 can be enlarged and thus reproduced. Furthermore, applying external alternate magnetic field Hex to magnetic domain 1310 transferred to enlarging and reproducing layer 13 provides a further improved signal reproduction characteristic.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium comprising:
   a recording layer having formed therein a magnetic domain magnetized according to a signal to be recorded;
   a reproducing layer receiving said magnetic domain transferred from said recording layer; and
   a heat sink layer formed in contact with said reproducing layer and said recording layer and blocking exchanging-coupling between said reproducing layer and said recording layer.

2. A magneto-optical recording medium comprising:
   a recording layer having formed therein a magnetic domain magnetized according to a signal to be recorded;
   a first reproducing layer receiving said magnetic domain transferred from said recording layer;
   a second reproducing layer receiving said magnetic domain transferred to said first reproducing layer and further transferred from said first reproducing layer through magnetostatic-coupling; and
   a heat sink layer formed in contact with said first reproducing layer and said recording layer and blocking exchanging-coupling between said first reproducing layer and said recording layer,
   wherein said second reproducing layer is formed of a magnetic material allowing said transferred magnetic domain to be enlarged by an external magnetic field.

3. A magneto-optical recording medium comprising:
   a recording layer having formed therein a magnetic domain magnetized according to a signal to be recorded;

a first heat sink layer formed in contact with said recording layer;

a reproducing layer receiving a magnetic domain transferred from said recording layer through magnetostatic-coupling; and a second heat sink layer formed in contact with said reproducing layer.

4. A magneto-optical recording medium comprising:

a recording layer having formed therein a magnetic domain magnetized according to a signal to be recorded;

a reproducing layer receiving said magnetic domain transferred from said recording layer; and a heat sink layer formed in contact with said reproducing layer and said recording layer and blocking exchanging-coupling between said reproducing layer and said recording layer, wherein said reproducing layer is formed of a magnetic material allowing said transferred magnetic domain to be enlarged by an external magnetic field.

5. A magneto-optical recording medium comprising:

a recording layer having formed therein a magnetic domain magnetized according to a signal to be recorded;

a non-magnetic layer formed in contact with said recording layer;

a reproducing layer receiving said magnetic domain transferred from said recording layer; and a heat sink layer formed in contact with said reproducing layer.

6. The magneto-optical recording medium of claim 1, satisfying $(Pc \times Tex)/(p \times t) \leq 1$, wherein Tex represents a minimal film thickness required to block exchanging-coupling, Pc represents a heat conductivity of a material of said reproducing layer higher than a heat conductivity of any other material of said reproducing layer at room temperature, p represents a heat conductivity of a material of said heat sink layer at room temperature and t represents a thickness of said heat sink layer, t being larger than Tex.

7. The magneto-optical recording medium of claim 2, satisfying $(Pc \times Tex)/(p \times t) \leq 1$, wherein Tex represents a minimal film thickness required to block exchanging-coupling, Pc represents a heat conductivity of a material of said first reproducing layer higher than a heat conductivity of any other material of said first reproducing layer at room temperature, p represents a heat conductivity of a material of said heat sink layer at room temperature and t represents a thickness of said heat sink layer, t being larger than Tex.

8. The magneto-optical recording medium of claim 3, satisfying $Pc \times Tex)/(p \times t) \leq 1$, wherein Tex represents a minimal film thickness required to block exchanging-coupling, Pc represents a heat conductivity of a material of said reproducing layer higher than a heat conductivity of any other material of said reproducing layer at room temperature, p represents a heat conductivity of a material of said second heat sink layer at room temperature and t represents a thickness of said second heat sink layer, t being larger than Tex.

9. The magneto-optical recording medium of claim 4, satisfying $(Pc \times Tex)/(p \times t) \leq 1$, wherein Tex represents a minimal film thickness required to block exchanging-coupling, Pc represents a heat conductivity of a material of said reproducing layer higher than a heat conductivity of any other material of said reproducing layer at room temperature, p represents a heat conductivity of a material of said heat sink layer at room temperature and t represents a thickness of said heat sink layer, t being larger than Tex.

10. The magneto-optical recording medium of claim 5, satisfying $(Pc \times Tex)/(p \times t) \leq 1$, wherein Tex represents a minimal film thickness required to block exchanging-coupling, Pc represents a heat conductivity of a material of said reproducing layer higher than a heat conductivity of any other material of said reproducing layer at room temperature, p represents a heat conductivity of a material of said heat sink layer at room temperature and t represents a thickness of said heat sink layer, t being larger than Tex.

11. The magneto-optical recording medium of claim 1, wherein said heat sink layer is formed of a non-magnetic material.

12. The magneto-optical recording medium of claim 2, wherein said heat sink layer is formed of a non-magnetic material.

13. The magneto-optical recording medium of claim 3, wherein said second heat sink layer is formed of a non-magnetic material.

14. The magneto-optical recording medium of claim 4, wherein said heat sink layer is formed of a non-magnetic material.

15. The magneto-optical recording medium of claim 5, wherein said heat sink layer is formed of a non-magnetic material.

16. The magneto-optical recording medium of claim 1, wherein said heat sink layer is formed of a magnetic material having a Curie temperature lower than a temperature allowing a signal to be reproduced.

17. The magneto-optical recording medium of claim 2, wherein said heat sink layer is formed of a magnetic material having a Curie temperature lower than a temperature allowing a signal to be reproduced.

18. The magneto-optical recording medium of claim 3, wherein said second heat sink layer is formed of a magnetic material.

19. The magneto-optical recording medium of claim 4, wherein said heat sink layer is formed of a magnetic material.

20. The magneto-optical recording medium of claim 5, wherein said heat sink layer is formed of a magnetic material.

* * * * *